United States Patent
Kirschner

(10) Patent No.: US 11,436,315 B2
(45) Date of Patent: Sep. 6, 2022

(54) FORCED SELF AUTHENTICATION

(71) Applicant: Nuvoton Technology Corporation, Hsin-chu (TW)

(72) Inventor: Yuval Kirschner, Even Yehuda (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 382 days.

(21) Appl. No.: 16/541,218

(22) Filed: Aug. 15, 2019

(65) Prior Publication Data
US 2021/0049258 A1 Feb. 18, 2021

(51) Int. Cl.
*G06F 21/45* (2013.01)
*G06F 21/44* (2013.01)
*G06F 9/38* (2018.01)

(52) U.S. Cl.
CPC .............. *G06F 21/45* (2013.01); *G06F 21/44* (2013.01); *G06F 9/3802* (2013.01)

(58) Field of Classification Search
CPC .......... G06F 21/45; G06F 21/44; G06F 21/52; G06F 21/572; G06F 9/3802
See application file for complete search history.

(56) References Cited

U.S. PATENT DOCUMENTS

| | | |
|---|---|---|
| 5,696,994 A | 12/1997 | Pang |
| 5,713,006 A | 1/1998 | Shigeeda |
| 5,713,306 A | 2/1998 | Johnson |
| 5,740,404 A | 4/1998 | Baji |
| 6,026,293 A * | 2/2000 | Osborn ................. H04L 63/123 |
| | | 455/411 |
| 6,049,876 A | 4/2000 | Moughanni et al. |
| 6,088,450 A | 7/2000 | Davis et al. |
| 6,289,408 B1 | 9/2001 | Regal |
| 6,510,522 B1 | 1/2003 | Heinrich et al. |
| 6,832,317 B1 | 12/2004 | Strongin et al. |
| 7,065,654 B1 | 6/2006 | Gulick et al. |
| 7,155,615 B1 | 12/2006 | Silvester |
| 7,205,883 B2 | 4/2007 | Bailey |
| 7,496,929 B2 | 2/2009 | Dunstan |
| 7,664,836 B2 | 2/2010 | Kim |
| 7,797,115 B2 | 9/2010 | Tasher et al. |
| 8,782,434 B1 | 7/2014 | Ghose |
| 9,158,628 B2 | 10/2015 | Maity et al. |
| 9,239,925 B2 | 1/2016 | Cumming et al. |
| 9,432,298 B1 | 8/2016 | Smith |

(Continued)

OTHER PUBLICATIONS

National Institute of Standards and Technology, "Implementation Guidance for FIPS 140-2 and the Cryptographic Module Validation Program", pp. 1-252, Mar. 28, 2003.

(Continued)

*Primary Examiner* — Nelson S. Giddins
(74) *Attorney, Agent, or Firm* — Kligler & Associates Patent Attorneys Ltd

(57) ABSTRACT

A computer system includes a memory, a processor and authentication enforcement hardware. The processor is configured to execute software, including an authentication program that authenticates data stored in the memory. The authentication enforcement hardware is coupled to the processor and is configured to verify that (i) the processor executes the authentication program periodically with at least a specified frequency, and that (ii) the authentication program successfully authenticates the data.

12 Claims, 2 Drawing Sheets

(56) References Cited

U.S. PATENT DOCUMENTS

| | | | |
|---|---|---|---|
| 10,095,891 | B2 | 10/2018 | Hershman et al. |
| 10,303,880 | B2 | 5/2019 | Hershman et al. |
| 10,452,582 | B2 | 10/2019 | Hershman et al. |
| 2002/0087872 | A1 | 7/2002 | Wells et al. |
| 2003/0061494 | A1 | 3/2003 | Girard et al. |
| 2004/0081079 | A1 | 4/2004 | Forest et al. |
| 2004/0255071 | A1 | 12/2004 | Larson et al. |
| 2004/0268138 | A1 | 12/2004 | Larson et al. |
| 2005/0021968 | A1 | 1/2005 | Zimmer et al. |
| 2005/0132186 | A1 | 6/2005 | Khan et al. |
| 2005/0204162 | A1 | 9/2005 | Rayes et al. |
| 2006/0059360 | A1 | 3/2006 | Ortkiese |
| 2006/0107032 | A1 | 5/2006 | Paaske et al. |
| 2007/0109015 | A1 | 5/2007 | Hanes et al. |
| 2008/0177994 | A1 | 7/2008 | Mayer |
| 2008/0276302 | A1 | 11/2008 | Touboul |
| 2008/0282017 | A1 | 11/2008 | Carpenter et al. |
| 2010/0037321 | A1 | 2/2010 | Oz et al. |
| 2012/0163589 | A1 | 6/2012 | Johnson et al. |
| 2012/0210115 | A1 | 8/2012 | Park et al. |
| 2012/0255012 | A1 | 10/2012 | Sallam |
| 2012/0255014 | A1 | 10/2012 | Sallam |
| 2013/0166975 | A1 | 6/2013 | Son et al. |
| 2013/0254906 | A1 | 9/2013 | Kessler et al. |
| 2013/0312099 | A1 | 11/2013 | Edwards et al. |
| 2015/0026426 | A1 | 1/2015 | Sahita et al. |
| 2016/0188909 | A1 | 6/2016 | Zatko et al. |
| 2017/0206034 | A1 | 7/2017 | Fetik |
| 2017/0364700 | A1 | 12/2017 | Goldfarb et al. |
| 2018/0365974 | A1 | 12/2018 | Haas et al. |
| 2019/0236276 | A1 | 8/2019 | Hershman et al. |
| 2019/0236278 | A1 | 8/2019 | Martinez et al. |
| 2019/0236281 | A1 | 8/2019 | Hershman et al. |

OTHER PUBLICATIONS

National Institute of Standards and Technology, "Security Requirements for Cryptographic Modules", FIPS PUB 140-2, pp. 1-69, May 25, 2001.

National Institute of Standards and Technology, "Secure Hash Standard (SHS)", FIPS PUB 180-4, pp. 1-36, Aug. 2015.

National Institute of Standards and Technology, "The Keyed-Hash Message Authentication Code (HMAC)", FIPS PUB 198-1, pp. 1-13, Jul. 2008.

Unified EFI Forum, Inc., "Unified Extensible Firmware Interface (UEFI) Specification", version 2.7, errata A, pp. 1-75 (chapter 8.2—pp. 237-259, chapter 23.1—pp. 1001-1016, chapter 31—pp. 1697-1730), Aug. 2017.

U.S. Appl. No. 16/568,299 office action dated Apr. 29, 2020.

U.S. Appl. No. 16/377,212 office action dated Oct. 18, 2019.

Winbond-Spiflash, "3V 256M-BIT, Serial Flash Memory With Dual/Quad SPI & QPI", pp. 1-104, Nov. 13, 2015.

NXP Semiconductors "UM10204—I2C-bus specification and user manual", Revision 6 , pp. 1-64, Apr. 4, 2014.

TCG Software Stack (TSS) Specification Version 1.2, Level 1, Errata A, Part 1: Commands and Structures, pp. 1-757, Mar. 7, 2007.

TCG PC Client Specific Implementation Specification for Conventional BIOS, Specification Version 1.21 Errata, Revision 1.00, pp. 1-151, Feb. 24, 2012.

TCG PC Client Specific TPM Interface Specification (TIS), Specification Version 1.3, pp. 1-112, Mar. 21, 2013.

TPM Main Specification, "Part 1—Design Principles", version 1.2, Revision 116, pp. 1-184, Mar. 1, 2011.

TPM Main Specification, "Part 2—Structures", version 1.2, Level 2, Revision 116, pp. 1-201, Mar. 1, 2011.

TPM Main Specification, "Part 3—Commands", version 1.2, Level 2, Revision 116, pp. 1-339, Mar. 1, 2011.

U.S. Appl. No. 16/907,248 Office Action dated Jun. 30, 2022.

\* cited by examiner

FORCED SELF AUTHENTICATION

FIELD OF THE INVENTION

The present invention relates generally to secure computing environments, and particularly to methods and systems for forcing a computer system to self-authenticate.

BACKGROUND OF THE INVENTION

Computer systems typically comprise one or more Central-Processing Units (CPUs) and a memory, wherein the CPU executes software programs that are stored in the memory. In some computer systems, the computer authenticates the software that the computer executes, using cryptographic techniques.

Methods to verify the authenticity of the firmware (and other software or data) are described, for example in "SECURITY REQUIREMENTS FOR CRYPTOGRAPHIC MODULES, Implementation Guidelines", NIST-FIPS 140-2, initially released on Mar. 28, 2003; in "The Keyed-Hash Message Authentication Code", FIPS PUB 198-1, July 2008; in "Secure Hash Standard (SHS)," NIST-FIPS 180-4, August, 2015; and in "UEFI (Unified Extensible Firmware Interface Forum) specifications," version 2.7 (Errata A), August 2017.

SUMMARY OF THE INVENTION

An embodiment of the present invention that is described herein provides a computer system including a memory, processor and authentication enforcement hardware. The processor is configured to execute software, including an authentication program, that authenticates data stored in the memory. The authentication enforcement hardware is coupled to the processor and is configured to verify that (i) the processor executes the authentication program periodically with at least a specified frequency, and that (ii) the authentication program successfully authenticates the data.

In some embodiments, the authentication enforcement hardware is configured to initiate a responsive action when the processor fails to execute the authentication program with at least the specified frequency. Additionally or alternatively, the authentication enforcement hardware is configured to initiate a responsive action when the authentication program fails to authenticate the data.

In an embodiment, the authentication program instructs the processor to assert a signal upon successfully authenticating the data, and the authentication enforcement hardware comprises a timer configured to verify that the signal is asserted with at least the specified frequency. in another embodiment, the processor is configured to execute the authentication program from a Read-Only Memory (ROM), and the authentication enforcement hardware is configured to decide that a given run of the authentication program completed successfully only in response to verifying that the given run was executed from the ROM. The authentication enforcement hardware may be configured to verify whether the given run was executed from the ROM, by detecting whether instructions of the authentication program have been fetched from the ROM.

There is additionally provided, in accordance with an embodiment of the present invention, a method including, using a processor, executing software including an authentication program that authenticates data stored in a memory. Using authentication enforcement hardware that is coupled to the processor, a verification is made that (i) the processor executes the authentication program periodically with at least a specified frequency, and that (ii) the authentication program successfully authenticates the data.

The present invention will be more fully understood from the following detailed description of the embodiments thereof, taken together with the drawings in which:

DETAILED DESCRIPTION OF EMBODIMENTS

Overview

Figure 1:
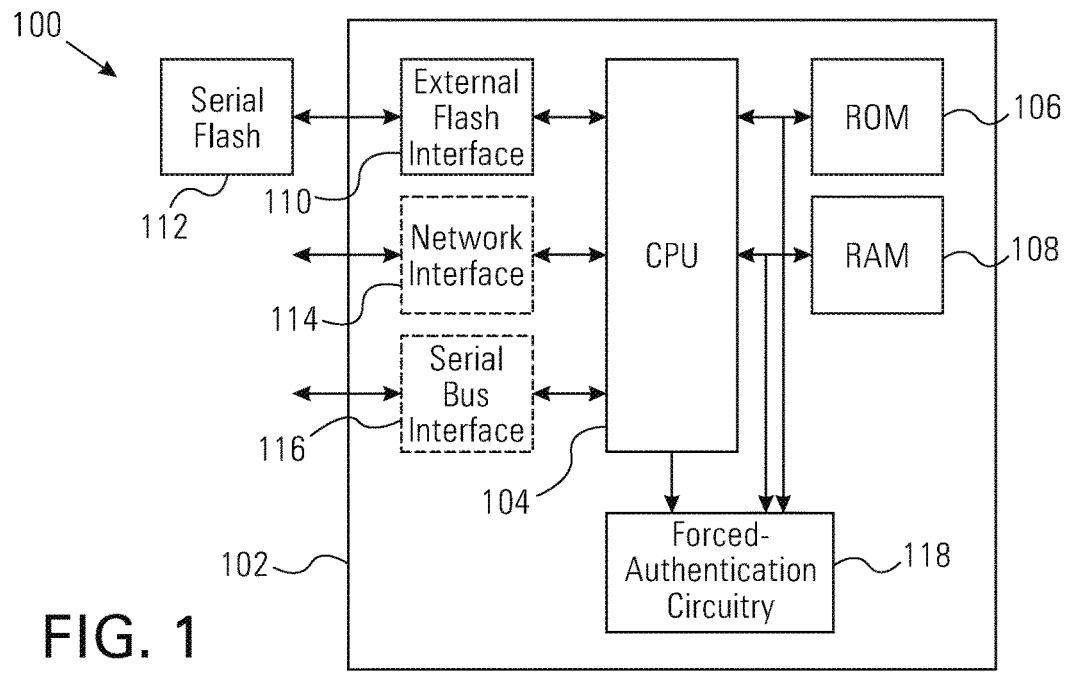
FIG. 1 is a block diagram that schematically illustrates a computer system with forced authentication, in accordance with an embodiment of the present invention.

Computer systems (and microcontrollers in particular) typically comprise a Random-Access Memory (RAM) that stores firmware code (FW) and data. For example, the FW may be downloaded from an external serial flash, by a Bootloader that is stored in a Read-Only-Memory (ROM), and then executed from the RAM. In other examples the FW may be downloaded from a network, or from another external source, via a parallel or a serial bus, wired or wireless.

The Bootloader may authenticate the FW that downloads (using cryptographic techniques such as key-based signatures) and, as ROM-code is considered safe, the downloaded FW can be trusted. However, once downloaded, the FW may run for long periods of time (e.g., months or years), sometimes as long as power supply to the computer system is not interrupted. Once a hacker manages to break the security of the computer system and load a modified code (e.g., by glitching the power supply of a chip, by enabling a debug port, or by injecting data directly to the RAM), the modified code could run practically forever, with severe security implications (the modified FW will be referred to hereinbelow as "malicious FW" or "malicious code").

Embodiments of the present invention that are disclosed herein provide methods and systems for forcing a computer system to periodically self-authenticate, decreasing the risk that a malicious FW will replace the authentic FW and run for long periods of time. In an embodiment, the FW comprises authentication functions, that authenticate the memory contents or parts thereof periodically (e.g., triggered by a programmable timer); if the authentication fails, the computer system issues a Reset (or, in an embodiment, a n-Maskable Interrupt—NMI; in another embodiment execution may halt). Thereafter, the computer system will re-boot, scrapping the FW that is stored in the RAM.

In some embodiments, the computer system comprises forced-authentication circuitry (FAC), also referred to as authentication enforcement hardware, which verifies that (i)

the FW runs the authentication functions periodically with sufficient frequency, and (ii) the authentications complete successfully. In one example embodiment, the FW asserts an AUTHENTICATION-OK signal (typically a single bit in a register) if the authentication program completes successfully (that is—the FW or parts thereof is authenticated). The FAC in this example comprises a timer that resets when AUTHENTICATION-OK is asserted, and, in effect, counts time from the last successful authentication. If the timer reaches a preset threshold, the FAC forces the computer system to reboot, e.g., by issuing a Reset or an NMI.

In embodiments, the FAC is inaccessible by the software, except for setting the AUTHENTICATION-OK input by the software. In some embodiments, the authentication function is stored in a ROM, and the FW invokes the authentication function periodically. In an embodiment, to avoid a forged AUTHENTICATION-OK signaling that does not follow successful authentication, the FAC ignores AUTHENTICATION-OK signaling if the last instruction is not fetched from the ROM; thus, AUTHENTICATION-OK can only be accepted if indicated by the authentication function that is stored in the presumably-safe ROM.

Although the description hereinabove relates to authentication of the FW, embodiments according to the present invention do not necessarily authenticate the complete FW and may refer to portions of the FW, or, in general, to authentication of data in the computer system memory.

In summary, embodiments according to the present invention force the computer system to periodically authenticate data that is stored in the RAM (for example, the complete FW). Circuitry in the computer system assures that failure to authenticate the RAM data within a preset time threshold will result in a Reset, an NMI, or otherwise stop FW execution or take other responsive action. The FW cannot fake a successful authentication, because the circuitry is inaccessible to the FW, except for ROM-based FW, which can notify successful authentication. User software performance not affected by the added mechanism, except for the periodical invocations of the authentication function.

System Description

We present herein several examples of a computer system and elements thereof, according to embodiments of the present invention. It should be emphasized that the examples by no way limit the scope of the invention.

FIG. 1 is a block diagram 100 that schematical illustrates a computer system 102 with forced authentication, in accordance with an embodiment of the present invention.

Computer system 102 comprises a CPU 104 (also referred to as a processor), which is configured to execute programs that are stored in its memory; a Read-Only-Memory (ROM) 106, which is configured to store initial boot code and other functions and data, including trusted FW functions; and a Random Access Memory (RAM) 108, which is configured to store FW code and data ROM 106 and RAM 108 will be collectively referred to as the computer system memory.

To download the FW, Computer System 102 further comprises an External Flash Interface 110, which is configured to communicate with a Serial Flash memory 112 that may store the FW (external to the computer system). Computer System 102 may optionally comprise other interfaces for downloading the FW—a Network Interface 114, configured to communicate between the computer system and a network (e.g., Ethernet) and download the FW from a network; and a Serial Bus interface 116, configured to communicate between the computer system and external devices over a serial bus (e.g., Inter-Integrated Circuit (I2C), to download the FW over a serial bus. Computer System 102 may optionally comprise other interfaces that are configured to download the FW from external sources (some examples will be given hereinbelow).

According to embodiments of the present invention, when computer system 102 loads a FW, the computer system authenticates the FW (or parts thereof) using, for example, cryptographic signatures. The authentication program is typically stored, at least partially, in ROM 106, and if the authentication fails the computer system will not load the FW (the computer system may, for example, halt, reset, or generate a Non-Maskable Interrupt (NMI)). If the authentication is successful, CPU 104 loads the FW in RAM 108 and, thereafter, CPU 104 executes the FW from the RAM (Serial Flash 112 may be disconnected).

In some applications of the computer system, the CPU may execute the FW for long periods of times. For example, a computer system in a production floor may download a stable and mature process control FW, and then execute it for months and years (as long as the power is not interrupted). Such long periods present an opportunity for hackers to attack the computer system and change the FW, for example, by glitching the power input, by enabling a debug port or by injecting data directly to the RAM. The authentication that the computer system executes before loading the FW is, therefore, inadequate.

To mitigate this risk, according to embodiments of the present invention, FW that the computer system executes must comprise periodic authentications of RAM data, for example, once every 10 seconds (actual numbers may vary from seconds to hours, according to the desired trade off point between performance and power spent on authentication vs. security risk and recovery time). In some embodiments the authentication rate is not fixed, but a maximum time between authentication runs that the computer system must execute is defined.

However, a hacker can disable the perodic authentication and thus allow a malicious FW to run for long periods of time. To mitigate this risk, computer system 102 further comprises a Forced-Authentication Circuitry (FAC) 118. FAC 118 receives from CPU 104 a signal that indicates successful authentication whenever an authentication run completes successfully. The FAC may comprise a timer and verify that new authentication runs are signaled by the CPU, at intervals that are not longer than a preset threshold.

According to the example embodiment described with reference to FIG. 1, the authentication program is stored, at least partially, in ROM 106, and the FW in RAM runs authentication by invoking ROM based functions. The FAC is further configured to monitor the memory accesses of the CPU, and to block indications of successful authentication unless such indications are generated as a result of the execution of ROM-based instructions. Thus, a hacker cannot fake successful authentication runs, and FAC 118 will detect failure to authenticate in time. The execution of the malicious FW will be terminated either by authentication failure or by failing to run the authentication in a predefined time period.

As would be appreciated, the embodiment of computing system 102 that is illustrated in FIG. 1 is an example embodiment that is cited by way of example. Computing systems in accordance with the disclosed techniques are not limited to the description hereinabove. In alternative embodiments, for example, any or all external flash interface 110, network interface 114 and serial bus interface 116 may be used, allowing FW download from a serial flash, and/or a network and/or a serial bus. In some embodiments the FW may be downloaded wirelessly, through a suitable interface; in yet other embodiments the FW may be downloaded via a fast system bus, such as Peripheral Component Interconnect Express (PCIe); and, lastly, each of interfaces 110, 114, 116 may be configured to interface with a plurality of devices.

In embodiments, CPU 104 may be an aggregation of more than one CPU, of the same or of different types; and, lastly, ROM 106 and/or RAM 108 may comprise a plurality of ROM/RAM instances.

Figure 2:
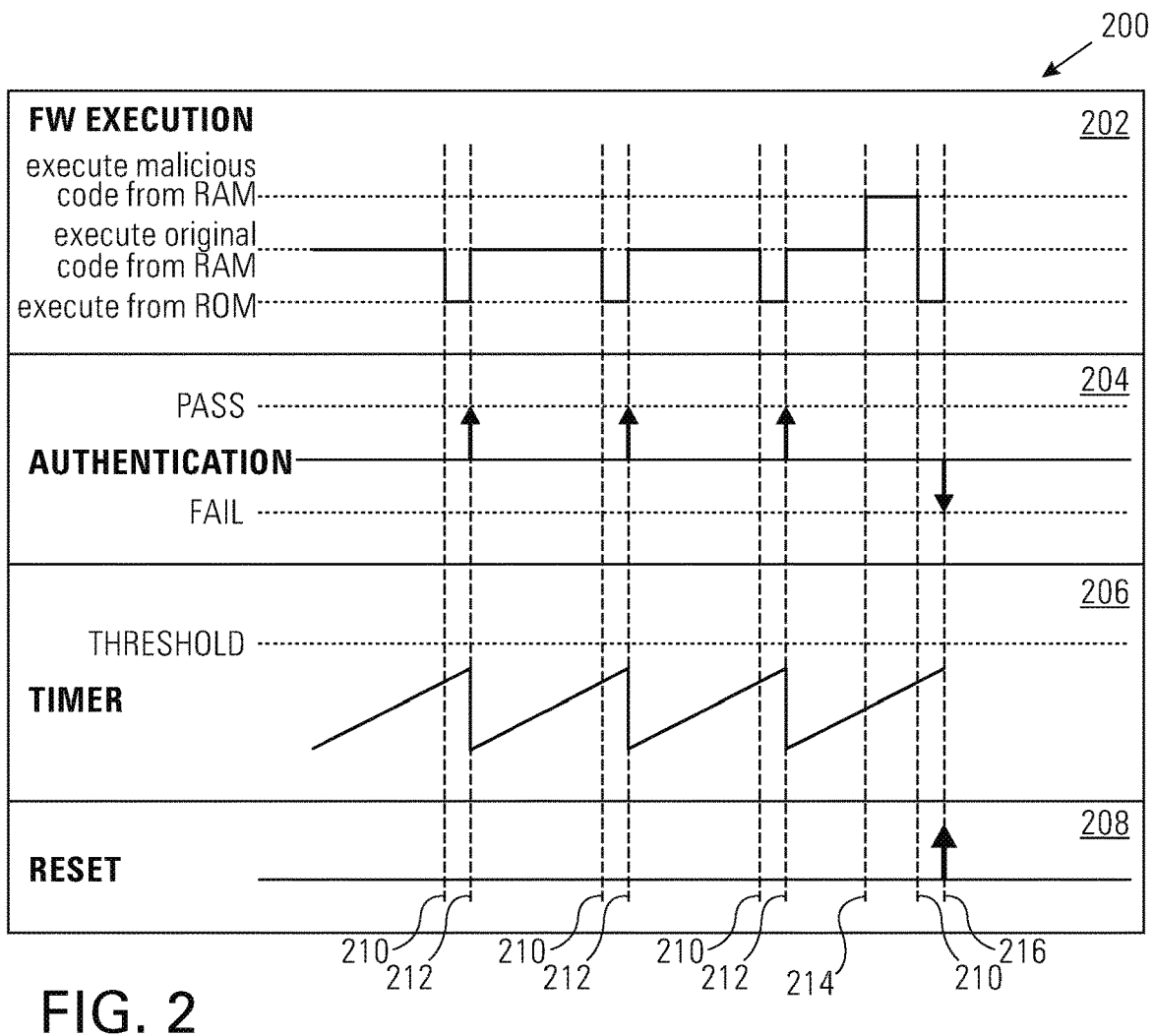
FIG. 2 is a timing waveform that schematically illustrates the protection of the computer system, of FIG. 1 when the self-authentication fails, in accordance with an embodiment of the present invention.

FIG. 2 is a timing waveform 200 that schematically illustrates the protection of a computing system, when the self-authentication fails, in accordance with an embodiment of the present invention. The timing waveform comprises a FW-execution waveform 202, which illustrates the varying FW execution sources; an Authentication-Results waveform 204, which indicates fail or pass of the authentication runs; a Timer waveform 206, which indicates the operation of the timer that verifies repetitive authentication runs; and, a Reset waveform 208, which indicates resetting of the computer system.

Flowchart 200 further comprises time indicators—time indicators 210 and 212, which indicate start and stop, respectively, of authentication runs; a time indicator 214, which indicates a time point wherein the CPU starts the execution of a malicious code; and a time indicator 216, which indicates the resetting of the computer system, responsive to failed authentication.

Initially, the FW executes from RAM. Then, at time indicator 210, the FW invokes an authentication program that is stored in ROM. At time indicator 212 the authentication is completed, and the FW generates an Authentication-OK signal (that is forwarded to FAC 118, of FIG. 1).

The Timer measures elapsed time by repeatedly incrementing and resets when the FAC receives the AUTHENTICATION-OK signal. The timer never reaches the Threshold, as a new signal is always received in a timely manner.

The sequence comprising FW execution from RAM followed by Authentication run from ROM and an Authentication-pass indicator repeats three times, until, at time indicator 214, the FW starts executing a corrupted (malicious) code. The next run of the authentication software will, therefore, result in an Authentication Fail signal (at time-indicator 216), and, consequently, a reset of the computer system.

Figure 3:
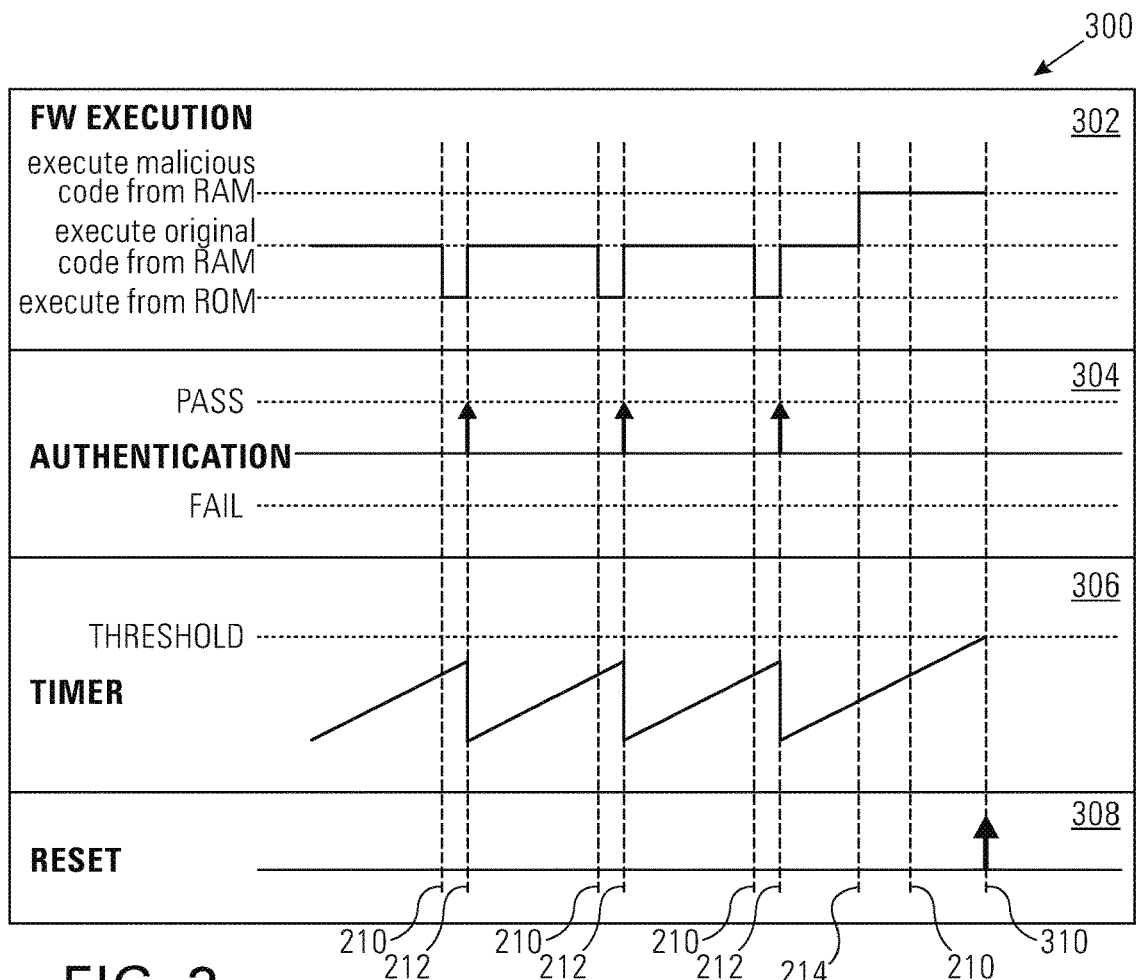
FIG. 3 is a timing waveform that schematically illustrates the protection of a computer system of FIG. 1 when the software fails to run the self-authentication software, in accordance with an embodiment of the present invention.

FIG. 3 is a timing waveform 300 that schematically illustrates the protection of a computing system, when the software fails to run the self-authentication software, in accordance with an embodiment of the present invention.

The waveform starts like waveform 200, and until time-indicator 210 the two waveforms are identical. However, the malicious FW that is loaded into the RAM at step 214 does not invoke the authentication functions that are stored in the ROM. As a result, no AUTHENTICATION-OK indications are generated, the timer does not reset, and at time-indication 310 the timer reaches the threshold. The FAC will then generate a Reset and the computer system will restart.

In summary, according to the example embodiments described with reference to FIGS. 2, 3, if the FW that is downloaded at step 214 is not authentic, the FW will either fail periodic authentication of RAM data or fail to authenticate within the preset threshold. In both cases the computer system will reset, either directly as a result of the failed authentication, or by the FAC, when the timer reaches the threshold.

As would be appreciated, the waveforms of the computing system that are illustrated in FIGS. 2 and 3 are example embodiments that are cited by way of example. Waveforms of computer systems in accordance with the disclosed techniques are not limited to the description hereinabove. In alternative embodiments, for example, the authentication program may be broken to segments, and, between the segments, the FW may execute from the RAM (for example, in application wherein fast response time is critical and cannot be met if the FW stops for a full authentication session). In other embodiments, reset is not generated by FAC 118; instead the FAC may stop all CPU executions; in an embodiment, the FAC generates an NMI, and in another embodiment the FAC may generate Reset if the authentication fails, and an NMI if the timer reaches the threshold.

Further, additionally or alternatively, FAC 118 may initiate any other suitable responsive action if (i) the authentication program is not invoked with at least the specified frequency, or (ii) if a certain invocation of the authentication program does not complete with successful authentication.

Figure 4:
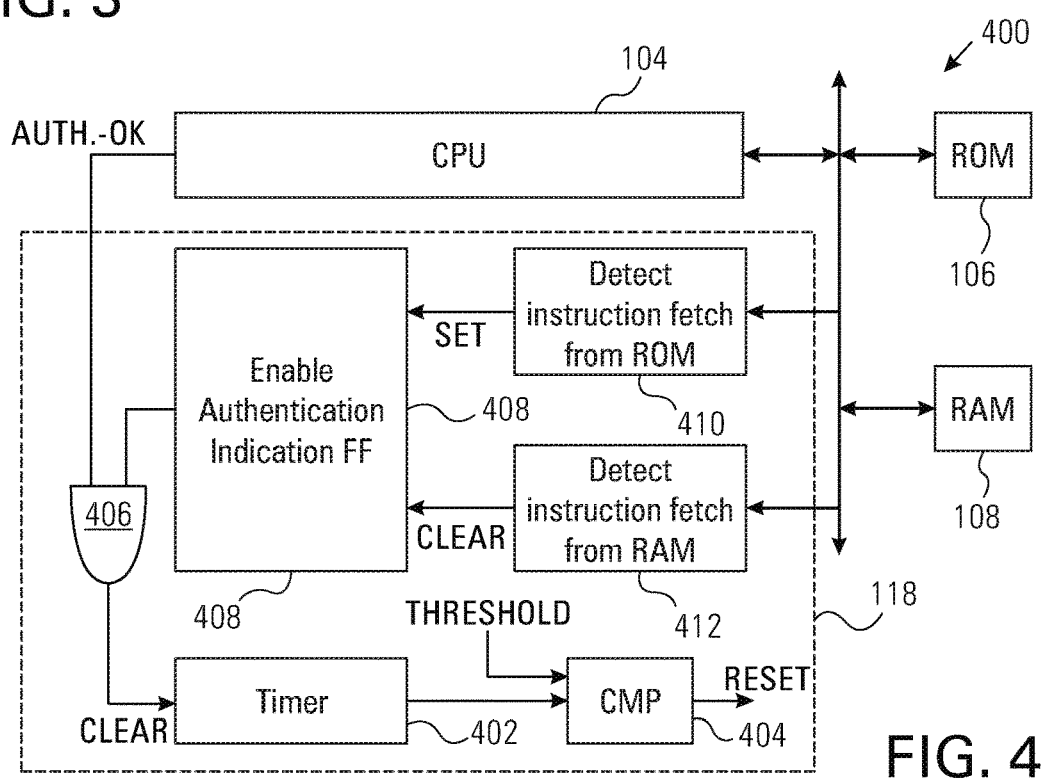
FIG. 4 is a block diagram that schematically illustrates the structure of a circuitry that forces self-authentication in a computer system, in accordance with an embodiment of the present invention.

FIG. 4 is a block diagram 400 that schematically illustrates the structure of a circuitry that forces self-authentication in a computer system (FAC), in accordance with an embodiment of the present invention. CPU 104 communicates with ROM 106 and RAM 108). FAC 118 is configured to monitor transactions between the CPU, ROM and RAM. The FAC is also coupled to CPU 104 through AUTHENTICATION-OK wire, used by the CPU to indicate that the authentication software completed successfully.

FAC 118 comprises a timer 402, which is configured to count the time (for example, count cycles of a fixed frequency clock signal) between receipt of AUTHENTICATION-OK indications; and a Comparator 404, which is configured to compare the time output by Timer 402 to a preset threshold, and to generate a Reset signal if the time is equal to the threshold. In the example embodiment of FIG. 4, the AUTHENTICATION-OK signal is one of CPU 104 IO pins, and AUTHENTICATION-OK is indicated by an Output instruction of the CPU.

A malicious FW may attempt to fool the forced-authentication mechanism described. hereinabove by periodically setting the AUTHENTICATION-OK indicator. This risk is answered by allowing the resetting of Timer 402 only if the CPU indicates AUTHENTICATION-OK as a result of executing an instruction. which. is stored in the ROM (which is presumed to be safe), as will be described hereinbelow.

FAG 118 further comprises a Gate 406; an Enable Authentication Indication Flipflop 408; a ROM-Instruction-Fetch Detector 410 and a RAM-Instruction-Fetch Detector 412. Gate 406 transfers AUTHENTICATION-OK indications from CPU 104 to Timer 402 only if Enable Authentication Indication Flipflop 408 is set. The Flipflop is set when ROM-Instruction-Fetch Detector 410, which monitors the CPU memory accesses, detects that the CPU fetches an instruction from the ROM, and cleared when RAM-Instruction-Fetch Detector 412 detects that the CPU fetches an instruction from the RAM. Thus, the only way for Timer 402 to clear is an AUTHENTICATION-OK indication that follows an instruction fetch from ROM and precedes and instructon fetch from RAM.

In some embodiments of computer system 102, the execution pipeline may result in delayed write operations relative to the corresponding instruction fetch and, thus, a ROM instruction that asserts the AUTHENTICATION-OK indication may lag the corresponding instruction fetch by one or more instructions, and, if the next instruction is executed from the RAM, resetting of the timer may be blocked. In those embodiments, the authentication software must continue execution from ROM for a few cycles, until the execution pipeline empties, for example, executing a preset number of NOP instructions.

In an alternative embodiment, ROM-Instruction-Fetch Detector 410 is configured to set an "enable authentication identification flag", responsive to a fetch from the first address of the authentication routine in the ROM. Thus, malicious FW will not be able to jump to the end of the routine (asserting Authentication OK) and the ROM routine will fully executed.

As would be appreciated, the embodiment of FAC 118 that is illustrated in FIG. 4 is an example embodiment that is cited by way of example. FACs in accordance with the disclosed techniques are not limited to the description hereinabove. In alternative embodiments, for example, CPU 104 indicates AUTHENTICATION-OK by writing to a memory address (pointing to an existing or to a non-existing memory). In such embodiments, FAC 118 comprises an AUTHENTICATION-OK-detector, which monitors the CPU memory accesses and detects AUTHENTICATION-OK signaling; the output of the detector is then input to gate 406 instead of the wire from CPU 104. In an embodiment, CMP 404 generates NMI instead of Reset, and in another embodiment CMP 404 generates a HALT signal that stops the CPU.

Thus, according to embodiments of the present invention that were presented hereinabove, a computer system that runs a FW from a RAM for long periods of time may be provided with protection against unauthorized modification. of the FW. The protection comprises—a) the FW must periodically authenticate data that is stored in the RAM (comprising the complete FW or parts thereof); b) the authentication. software is stored, at least partially, in a. ROM, and hence is relatively protected from hacking; c) a circuitry in the computer comprises a timer, and the circuitry resets, stops or interrupts the CPU if the authentication. is delayed for more than a preset threshold; and, d) the circuitry protects the AUTHENTICATION-OK indication from hacking by verifying that the indication was initiated by a ROM based instruction.

As would be appreciated, the embodiments of the computer system and the FAC that are illustrated in FIGS. 1 through 4 are example embodiments that are cited by way of example. Computer systems and FACs in accordance with the disclosed techniques are not limited to the description hereinabove. In alternative embodiments, for example, the FW is run from an external Flash (rather than from, the RAM) that needs to periodically self-authenticate. RAM 108 may be static or dynamic, embedded or external. CPU 104 may be any kind of a microcontroller (e.g., RISC, CISC), or a plurality of processors.

In some embodiments according to the present invention, the CPU may comprise a cache memory for frequently accessed data (and, in those embodiments, at least part of the authentication software is typically executed in a non-cached mode).

Computer system 102 or elements thereof, may be implemented using any suitable hardware, such as in an Application-Specific Integrated Circuit (ASIC) or a protected Field-Programmable Gate Array (FPGA). In some embodiments, some or all the elements of the controller can be implemented using software, using hardware, or using a combination of hardware and software elements.

Typically, CPU 104 comprises a general-purpose processor, which is programmed in software to carry out the functions described herein. The software may be downloaded to the processor in electronic form, over a network, for example, or it may, alternatively or additionally be provided and/or stored on non-transitory tangible media, such as magnetic, optical, or electronic memory.

ROM 106 may be emulated by other types of memories, like flash, RAM or One-Time-Programming memory (OTP), which include write/erase disable logic, and can thus emulate a ROM that is protected from altering.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent. any terms are defined in these incorporated documents in a manner that conflicts with the definitions made explicitly or implicitly in the present specification, only the definitions in the present specification should be considered.

The invention claimed is:

1. A computer system, comprising:
   a memory;
   a processor, configured to execute software, including an authentication program that authenticates data stored in the memory; and
   authentication enforcement hardware, which is coupled to the processor and is configured to verify: (i) that the processor executes the authentication program periodically with at least a specified frequency, and, (ii) that the authentication program successfully authenticates the data within at least a predetermined time period.

2. The computer system according to claim 1, wherein the authentication enforcement hardware is configured to initiate a responsive action when the processor fails to execute the authentication program within at least the predetermined time period.

3. The computer system according to claim 1, wherein the authentication enforcement hardware is configured to initiate a responsive action when the authentication program fails to authenticate the data.

4. The computer system according to claim 1, wherein the authentication program instructs the processor to assert a signal upon successfully authenticating the data, and wherein the authentication enforcement hardware comprises a timer configured to verify that the signal is asserted within at least the predetermined time period.

5. The computer system according to claim 1, wherein the processor is configured to execute the authentication program from a Read-Only Memory (ROM), and wherein the authentication enforcement hardware is configured to decide that a given run of the authentication program completed successfully only in response to verifying that the given run was executed from the ROM.

6. The computer system according to claim 5, wherein the authentication enforcement hardware is configured to verify whether the given run was executed from the ROM, by detecting whether instructions of the authentication program have been fetched from the ROM.

7. A method, comprising:
   using a processor, executing software, including an authentication program that authenticates data stored in a memory; and using authentication enforcement hardware that is coupled to the processor, verifying (i) that the processor executes the authentication program periodically with at least a specified frequency, and, (ii) that the authentication program successfully authenticates the data within at least a predetermined time period.

8. The method according to claim 7, and comprising initiating a responsive action by the authentication enforcement hardware when the processor fails to execute the authentication program within at least the predetermined time period.

9. The method according to claim 7, and comprising initiating a responsive action by the authentication enforcement hardware when the authentication program fails to authenticate the data.

10. The method according to claim 7, wherein the authentication program instructs the processor to assert a signal upon successfully authenticating the data, and wherein verifying that the processor executes the authentication program within at least the predetermined time period comprises verifying, using a timer in the authentication enforcement hardware, that the signal is asserted within at least the predetermined time period.

11. The method according to claim 7, wherein executing the software comprises executing the authentication program from a Read-Only Memory (ROM), and wherein verifying that the authentication program successfully authenticates the data comprises deciding that a given run of the authentication program completed successfully only in response to verifying that the given run was executed from the ROM.

12. The method according to claim 11, wherein verifying that the given run was executed from the ROM comprises detecting whether instructions of the authentication program have been fetched from the ROM.

* * * * *